No. 734,553.

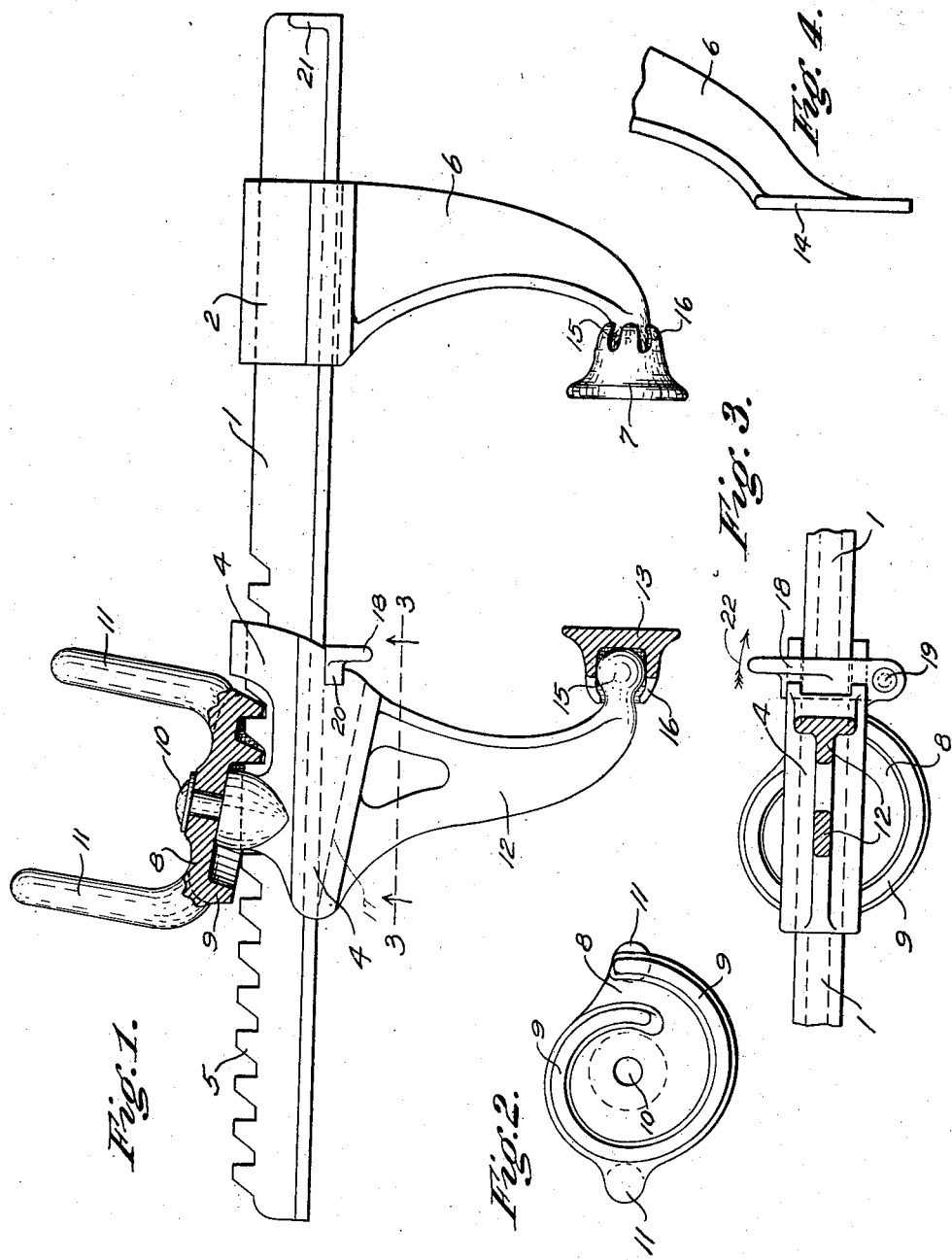

Patented July 28, 1903.

UNITED STATES PATENT OFFICE.

FREDERICK J. HERBERT, OF CHICAGO, ILLINOIS; JULIA COURTNEY EXECUTRIX OF SAID FREDERICK J. HERBERT, DECEASED.

CLAMP.

SPECIFICATION forming part of Letters Patent No. 734,553, dated July 28, 1903.

Application filed June 30, 1902. Serial No. 113,824. (No model.)

*To all whom it may concern:*

Be it known that I, FREDERICK J. HERBERT, a citizen of the United States of America, and a resident of Chicago, in the county of Cook and State of Illinois, have invented certain new and useful Improvements in Clamps, of which the following is a specification.

The main object of my invention is to provide a cabinet-maker's clamp which is simple in construction and which may be quickly set to an approximate position, besides permitting a wide range of adjustability while exerting its full power. I accomplish this object with the device shown in the accompanying drawings, in which—

Figure 1 is a side elevation, partly broken away, of a cabinet-maker's clamp constructed according to my invention. Fig. 2 is a bottom plan of the cam, by means of which the jaws of the clamp are drawn together. Fig. 3 is a section of the member 4 along the line 3 3 of Fig. 1. Fig. 4 is a modified form of the clamp-jaw.

In the device shown, 1 is a straight shank, preferably of T-shaped section, having a series of rack-teeth 5 extending from one end for a considerable distance along its narrow side. A sleeve 2 is loosely mounted upon the shank 1 and has projecting transversely to the shank an arm 6. This arm is provided with a clamp-jaw 7 at its end. The aperture in the sleeve 2, which receives the shank 1, is slightly larger than said shank and of a similar shape, so that said sleeve may be readily slid along the shank when it is parallel to the same, but will tilt when pressure is exerted on the clamp-jaw 7 and firmly lock itself upon said shank. A member 4 is also loosely mounted on the shank 1, so as to be slidable longitudinally of same. A cam, comprising a plate 8, having on its under side a spiral thread 9, is pivoted at 10 to the member 4 on an axis inclined to the length of the shank 1, so that the thread 9 is in mesh with the rack-teeth 5. The pitch of the spiral thread 9 is the same as that of the rack 5, so that one revolution of the plate 8 will cause the member 4 to move a distance of one tooth-space along the shank 1. The plate 8 is preferably provided with two handles 11, so that the operator can exert the strength of both hands upon the device. The arm 12 projects from the sleeve 4 on the side opposite to the cam and is provided with a clamp-jaw 13, adapted to coact with the clamp-jaw 7. The clamp-jaws 7 and 13 are preferably made swiveled, as shown in Fig. 1, but may be rigid on the arms, as shown at 14 in Fig. 4. The jaws 7 and 13 are provided with sockets fitting the balls 15 at the ends of the arms 6 and 12. The jaws 7 and 13 are made of malleable material, and the edges of the sockets are provided with projections 16, which are slightly bent inwardly to retain the balls in the sockets.

The aperture in the member 4, which receives the shank 1, has a cross-section similar in outline to that of said shank and slightly larger than said shank, so as to loosely fit same and allow the member 4 to slide freely along the shank. Said aperture becomes gradually larger toward the end of said member which is to the right in Fig. 1, as indicated by the dotted line 17, thus permitting the member 4 to be tilted, so as to throw the thread 9 out of mesh with the rack-teeth 5 and permit the member 4 to slide along the shank 1 without rotation of the plate 8. The stop 18, pivoted at 19 to the member 4 and resting in a recess 20 in said member, is adapted to retain the member 4 in the position shown in Fig. 1, with the thread 9 of the cam in mesh with the rack-teeth 5 of the shank, thus preventing the accidental tilting of the member 4. The lug 21 of the shank 1 prevents the sleeve 2 from slipping over the end of said shank.

The operation of my device is as follows: The parts of the device are normally in the position shown in Fig. 1, the member 4 being in such position that a considerable portion of the toothed part of the shank 1 projects to the right of said member. The article upon which it is desired to exert pressure is placed between the jaws 7 and 13 of the clamp, and the sleeve 2 is moved along the shank 1 until the jaws 7 and 13 are both in contact with said article. By turning the handles 11 in clockwise rotation the member 4, and with it the jaw 13, will be driven to the right along the shank 1, thus drawing the jaws 7 and 13 toward each other. Pressure is released by a reverse rotation of the handles 11. If it is desired to quickly return the member 4 to the end of the shank which is at the left in Fig. 1, the stop 18 may be swung in the direction of the arrow 22, thus permitting the member 4 to be tilted to release the contact of the thread 9 with the teeth 5, when the member 4 may be freely moved along the shank.

It will be seen that approximate adjustment may be had by sliding the sleeve 2 along the shank and still permit the exertion of the full power of the device throughout the entire length of the toothed part of said shank. The swivel-jaws permit the device to adapt itself to irregularities of the surface upon which pressure is exerted and also prevent the marring of such surfaces, which might occur on account of a slight inclination of the shank 1.

It will be seen that numerous details of the device shown may be altered without departing from the spirit of my invention. I therefore do not confine myself to such details except as hereinafter limited in the claims.

What I claim as my invention, and desire to secure by Letters Patent, is—

1. In a clamp, the combination of a shank, a sleeve mounted on said shank and slidable longitudinally thereof, a clamp-jaw secured to said sleeve, a member mounted on said shank and slidable longitudinally thereof, a second clamp-jaw secured to said member and adapted to coact with the jaw on said sleeve, rack and spiral gearing for causing said member to move along said shank, and means for releasing said member and permitting same to slide along said shank independently of said gearing.

2. In a clamp, the combination of a shank having thereon a series of rack-teeth, a sleeve mounted on said shank and slidable longitudinally thereof, a clamp-jaw secured to said sleeve, a member mounted on said shank and slidable longitudinally thereof, a second clamp-jaw secured to said member and adapted to coact with the jaw on said sleeve, a plate journaled on said member and having on its face a spiral thread in mesh with the teeth on said rack, means for rotating said plate and thereby causing said member to move along said shank, and means for tilting said member to release said spiral thread from mesh with said rack-teeth and thereby permit said member to move along said shank independently of the rotation of said plate.

3. In a clamp, the combination of a shank having thereon a series of rack-teeth, a sleeve mounted on said shank and slidable longitudinally thereof, a clamp-jaw secured to said sleeve, a member mounted on said shank and slidable longitudinally thereof, a second clamp-jaw secured to said member and adapted to coact with the jaw on said sleeve, a plate journaled on said member and having on its face a spiral thread in mesh with the teeth on said rack, means for rotating said plate and thereby causing said member to move along said shank, means for tilting said member to release said spiral thread from mesh with said rack-teeth and thereby permit said member to move along said shank independently of the rotation of said plate, and a movable stop for preventing the accidental tilting of said member.

4. In a clamp, the combination of a shank having thereon a series of rack-teeth, a sleeve mounted on said shank and slidable longitudinally thereof, a clamp-jaw secured to said sleeve, a member mounted on said shank and slidable longitudinally thereof, a second clamp-jaw secured to said member and adapted to coact with the jaw on said sleeve, a plate journaled on said member and having on its face a spiral thread in mesh with the teeth on said rack, two handles disposed on opposite sides of the axial center of said plate for rotating said plate and thereby causing said member to move along said shank, and means for tilting said member to release said spiral thread from mesh with said rack-teeth and thereby permit said member to move along said shank independently of the rotation of said plate.

Signed at Chicago this 24th day of June, 1902.

FREDERICK J. HERBERT.

Witnesses:
H. P. SIMONTON,
FRED W. MAYER.